United States Patent [19]
Tanaka

[11] Patent Number: 5,129,000
[45] Date of Patent: Jul. 7, 1992

[54] VOICE RECOGNITION METHOD BY ANALYZING SYLLABLES

[75] Inventor: Atsuo Tanaka, Mie, Japan

[73] Assignee: Sharp Kabushiki Kaisha, Osaka, Japan

[21] Appl. No.: 626,389

[22] Filed: Dec. 12, 1990

Related U.S. Application Data

[63] Continuation of Ser. No. 568,547, Aug. 16, 1990, abandoned, which is a continuation of Ser. No. 391,685, Aug. 9, 1989, abandoned, which is a continuation of Ser. No. 34,070, Apr. 2, 1987, abandoned.

[30] Foreign Application Priority Data

Apr. 5, 1986 [JP] Japan ............................ 61-78818
Apr. 5, 1986 [JP] Japan ............................ 61-78819
Apr. 5, 1986 [JP] Japan ............................ 61-78820

[51] Int. Cl.⁵ ............................................. G10L 9/06
[52] U.S. Cl. ...................................................... 381/42
[58] Field of Search ............................... 381/41–46; 364/513.5

[56] References Cited

U.S. PATENT DOCUMENTS

| | | | |
|---|---|---|---|
| 4,060,694 | 11/1977 | Suzuki et al. | 381/45 |
| 4,100,370 | 7/1978 | Suzuki et al. | 381/42 |
| 4,581,756 | 4/1986 | Togawa et al. | 381/43 |
| 4,590,605 | 5/1986 | Hataoka et al. | 381/43 |
| 4,625,287 | 11/1986 | Matsuura et al. | 381/41 |
| 4,665,548 | 5/1987 | Kahn | 381/43 |
| 4,723,290 | 2/1988 | Watanabe et al. | 381/43 |
| 4,783,802 | 11/1988 | Takebayashi et al. | 381/41 |

FOREIGN PATENT DOCUMENTS

585995 4/1983 Japan.

OTHER PUBLICATIONS

Nakatsu et al., "An Acoustic Processor in a Conversational Speech Recognition System", Rev. Elect. Comm. Labs., vol. 26, No. 11–12, pp. 1486–1504 Nov. 1978.

*Primary Examiner*—Emanuel S. Kemeny
*Assistant Examiner*—Michelle Doerrler
*Attorney, Agent, or Firm*—Morrison & Foerster

[57] ABSTRACT

A voice recognition system is disclosed which has incorporated therein information on the phonological effects on syllables. The system receives a voice signal and tentatively identifies syllable arrays and provides a collection of data on syllables in the arrays. The data are used to generate hypothetical syllable arrays from the tentatively identified arrays. The hypothetical arrays are evaluated via arithmetic operations, taking into consideration the effects of context, the speaker's habit and dialect, thereby determining a reliable representation of the input voice signal.

4 Claims, 2 Drawing Sheets

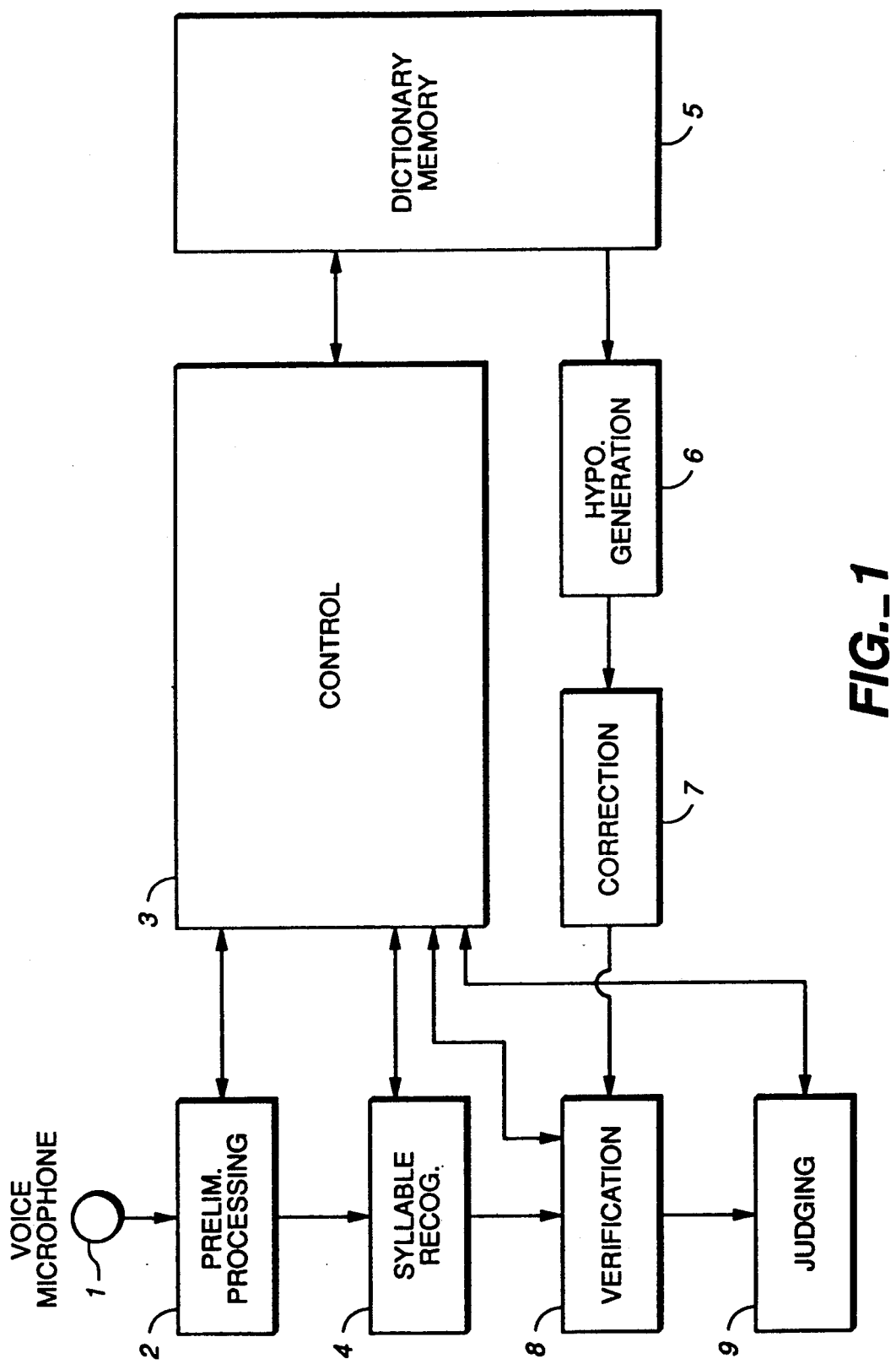
FIG._1

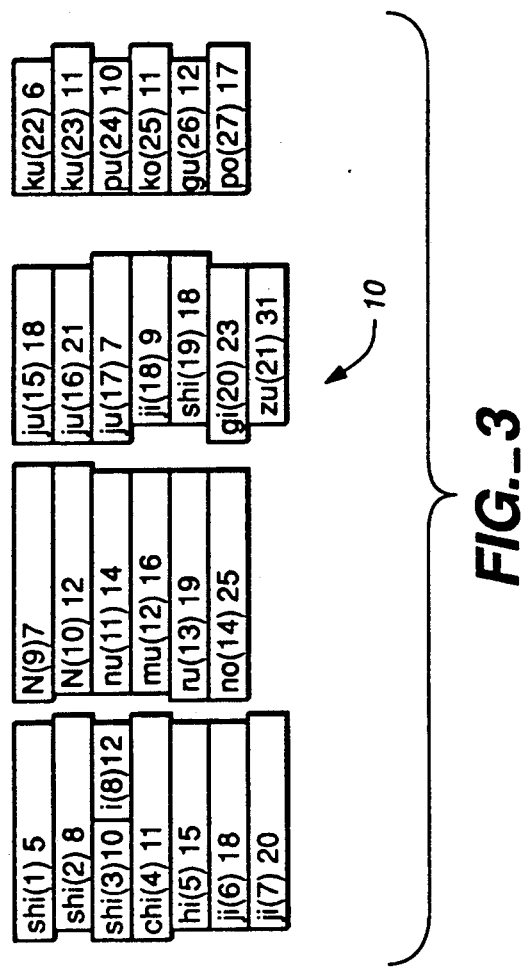
FIG._3
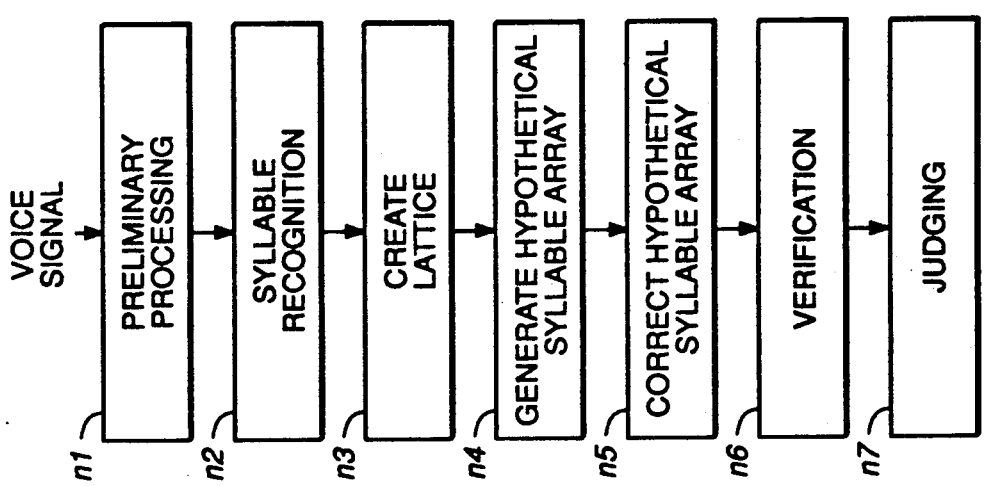
FIG._2

VOICE RECOGNITION METHOD BY ANALYZING SYLLABLES

This is a continuation of application Ser. No. 07/568,547 filed Aug. 16, 1990, to be abandoned, which is a continuation of application Ser. No. 07/391,685 filed Aug. 9, 1989, now abandoned, which is a continuation of application Ser. No. 07/034,070 filed Apr. 2, 1987, now abandoned.

BACKGROUND OF THE INVENTION

This invention relates to a voice recognition system for use, for example, with a voice word processor which can recognize input voice signals and display their contents on a cathode ray tube or the like.

Voice signals corresponding to a continuously delivered speech are difficult to analyze because vowels and consonants rarely appear in standard forms. Some groups of letters are often contracted or even omitted entirely, depending on the context, the speaker's mannerisms, dialect, etc. In addition, there are many words derived from a foreign language for which there is yet no commonly accepted way of pronunciation. Accordingly, in order to correctly identify a word, a phrase or a sentence an input voice signal, as many phonological variations from standard forms as possible should be taken into consideration and be incorporated into a voice recognition system.

With a conventional voice recognition system, however, words, phrases and sentences are often represented in phonologically fixed forms. Thus, correct interpretations cannot be expected unless syllable arrays are accurately pronounced.

SUMMARY OF THE INVENTION

It is therefore an object of the present invention to eliminate the aforementioned disadvantage of prior art voice recognition systems by providing a new system to which knowledge of phonological effects on syllables is incorporated so that it can be actively utilized for voice recognition. The system of the present invention tentatively identifies syllable arrays from a received voice signal and provides a collection of data on syllables in the arrays. This collection of data is used to generate hypothetical syllable arrays from the tentatively identified arrays and certain arithmetic operations are performed according to a predefined rule to evaluate these hypothetical syllable arrays. In generating such hypothetical syllable arrays, effects of the context, the speaker's habit and/or dialect are taken into consideration.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a block diagram showing the structure of a voice recognition system embodying the present invention, FIG. 2 is a flow chart of a voice recognition operation embodying the present invention, and FIG. 3 is a drawing showing an example of syllable lattice.

DETAILED DESCRIPTION OF THE INVENTION

Briefly described with reference both to FIG. 1 which is a block diagram showing the structure of a voice recognition system embodying the present invention and to FIG. 2 which is a flow chart of its operation, an input voice signal is received in Step n1 through a microphone 1 by a preliminary processing unit 2 where the input signal is analyzed under the control of a control unit 3, for example, by using cepstrum coefficients. Next (n2), the output from the preliminary processing unit 2 is transmitted to a syllable recognition unit 4 and is tentatively identified in units of syllables. A series of tentatively identified syllables thus obtained may be referred to as a hypothetical syllable array because corrections are yet to be made thereupon before the system makes the final interpretation of the input voice signal.

The syllable recognition unit 4 generates a collection of data on syllables each corresponding to one of the syllables in each hypothetical syllable array (n3). These syllables and their data including their scores to be explained below are conveniently arranged in the form of a lattice and, for this reason, such a collection of data is hereinafter referred to as a syllable lattice. This syllable lattice is referenced by a hypothetical syllable array generation unit 6 which generates candidate syllables corresponding to the syllables in the lattice under the control again of the control unit 3 (n4).

The aforementioned hypothetical syllable array is rewritten in a correction unit 7 according to a predefined rule (n5) and the hypothetical syllable array thus corrected is transmitted to a verification unit 8 which examines whether each of the syllables in the corrected syllable array is listed in the syllable lattice and calculates, by using the aforementioned scores related to syllables and according to a predefined formula, a score for each hypothetical syllable array (n6). A judging unit 9 receives the scores thus calculated and determines on the basis thereof which of the hypothetical syllable arrays considered represents the input voice signal most reliably (n7). The minimum requirement imposed on the aforementioned syllable recognition unit 4 is that it be able to output information related to the starting and end positions and lengths of syllables, for example, by segmentation. For this, the syllable recognition unit 4 may use any appropriate segmentation method to divide the preliminarily processed voice signal into intervals and compares the syllables obtained from individual intervals with known (standard) syllable patterns.

An example of the result obtained by the syllable recognition unit 4 is shown in Table 1 corresponding to an input voice signal from a speaker who says "Shinjuku" (the name of a district and a railroad station in Tokyo). In this situation, four intervals corresponding to syllables "shi", "N" (the nasal semi-vowel which frequently appears in the Japanese language), "ju" and "ku" are likely to be identified and these identified intervals are compared with standard (candidate) syllable patterns shown in Table 1, the first interval compared with syllables (1)–(8), the second interval compared with syllables (9)–(14), the third interval compared with syllables (15)–(21) and the fourth interval compared with syllables (22)–(27). Scores associated with these candidate syllabels are also listed together with their starting and end positions. The collection of data shown in Table 1 may be conveniently arranged as shown in FIG. 3 in the form of a lattice 10 and this is why such a collection of data is also referred to as a syllable lattice.

TABLE 1

| Candidate Syllable | Score | Start | End |
|---|---|---|---|
| shi (1) | 5 | 8 | 28 |
| shi (2) | 8 | 10 | 30 |
| shi (3) | 10 | 8 | 18 |
| chi (4) | 11 | 8 | 30 |
| hi (5) | 15 | 12 | 28 |
| ji (5) | 18 | 12 | 28 |
| ji (7) | 20 | 12 | 30 |
| i (8) | 12 | 20 | 28 |
| N (9) | 7 | 32 | 54 |
| N (10) | 12 | 34 | 54 |
| nu (11) | 14 | 34 | 52 |
| mu (12) | 16 | 34 | 52 |
| ru (13) | 19 | 32 | 52 |
| no (14) | 25 | 32 | 52 |
| ju (15) | 18 | 56 | 70 |
| ju (16) | 21 | 56 | 70 |
| ji (17) | 7 | 56 | 72 |
| ji (18) | 9 | 59 | 72 |
| shi (19) | 18 | 59 | 72 |
| gi (20) | 23 | 56 | 70 |
| zu (21) | 31 | 64 | 70 |
| ku (22) | 6 | 80 | 92 |
| ku (23) | 11 | 80 | 94 |
| pu (24) | 10 | 80 | 92 |
| ko (25) | 11 | 80 | 94 |
| gu (26) | 12 | 80 | 92 |
| po (27) | 17 | 80 | 94 |

The control unit 3 causes the hypothetical syllable array generation unit 6 to extract hypothetical syllable arrays from the dictionary memory 5, and to transmit them to the correction unit 7. Since it is not economical to extract all hypothetical arrays sequentially, the control unit 3 makes reference to the syllable lattice in this process.

The correction unit 7 is provided with a rule table for rewriting hypothetical syllable arrays. Each hypothetical syllable array transmitted from the hypothetical syllable array generation unit 6 is tentatively stored in a buffer for comparison with this rule table and after corrections are effected, a new (rewritten) hypothetical syllable array is transmitted to the verification unit 8. Table 2 shows by examples how to generate a new hypothetical syllable array from an original by using a rule table. In Table 2, the "/" represents a spacer between syllables and the "," indicates a logical OR.

TABLE 2

| Example | Original | After Correction |
|---|---|---|
| 1 | ju/ku | ju,ji[0]/ku |
| 2 | myu/ni | myu,mi[0]/ni |
| 3 | ba/a/i | ba/a,wa[1]/i |
| 4 | o/wa | o/wa,a[1] |

The first example in Table 2 shows that the Japanese syllable array "juku" as in the name of the aforementioned district in Tokyo is pronounced by many people as "jiku". Thus, no penalty (shown by "0" inside square brackets) is imposed if what is written in Japanese as "juku" is mispronounced as "jiku". The second example in Table 2 relates to the syllable array "myuni" which does not exist in the traditional Japanese language. In reading the English word "communication," for example, many Japanese pronounce the second and third syllables thereof as "mini" rather than "myuni" (as would be written in romanized Japanese according to Hepburn). For this reason, the rule of writing given by Table 2 imposes no penalty for saying "mi" in place of "myu" in this context. The third example in Table 2 reflects the observation that many Japanese pronounce the Japanese word "baai" as "bawai" but this is still considered an error. This is why a penalty of one point is imposed for pronouncing "bawai" instead of "baai". Similarly, the four example in Table 2 shows that the syllable array "owa" is frequently mispronounced as "oa" but is is still considered an error according to the rule adopted by Table 2. The correction unit 7 makes use of these correction rules for rewriting to generate a new set of syllable arrays.

In order to prevent errors in identification of syllables, hypothetical (candidate) syllables may be considered for each tentatively identified syllable. Rules for rewriting tentatively identified syllables may be written, for example, as shown in Table 3. For example, if a syllable is tentatively identified as "shi", additional hypothetical syllables "ji" and "hi" are also generated with respective penalty values of 2 and 3. The originally identified syllable ("shi" in this case) corresponds to no penalty. The penalties assigned in connection with the rewriting according to Table 3 may be referred to as penalties of the second kind in order to distinguish them from those assigned in connection with Table 2 which may likewise be referred to as penalties of the first kind.

TABLE 3

| Example | Original | After Correction |
|---|---|---|
| (1) | shi | shi[0], ji[2], hi[3] |
| (2) | N | N[0], nu[2], mu[2] |
| (3) | ju | ju[0], shu[4], zu[6] |
| (4) | ji | ji[0], shi[4], zu[6] |
| (5) | ku | ku[0], pu[2], ko[4] |

Thus, if the tentatively identified syllable array is "shinjuku" as in the previously considered example, it is rewritten first according to the rules partially illustrated in Table 2 into "shi/N/ju,ji[0]/ku" and this is further rewritten as "shi[0],ji[2],hi[3]/N[0], nu[2],mu[2]/ju[0],-shu[4],zu[6],ji[0][1],shi[4 ][1],gi [5][1]/ku[0],pu[2]-,ko[4]". The result thus obtained is sent from the correction unit 7 into the verification unit 8 which checks sequentially whether each syllable in this rewritten syllable array is found in the syllable lattice and calculates a score C for evaluating the syllable array.

The score C for evaluating each hypothetical syllable array is calculated generally as a function of the scores of the matching syllables and their associated penalties. For example, the score C may be calculated by the following formula:

$$C = \sum_{i=1}^{N} X_i + W \sum_{i=1}^{M} Y_i$$

where $X_i$ represents the matching score for the $i^{th}$ syllable in the hypothetical syllable array, $Y_i$ represents the $i^{th}$ penalty value of the type appearing in Table 2, N is the number of syllables in the array, M is the total number of penalties and W is an appropriate weight factor. Since the calculation would become too long if the score C were to be obtained for all combinations of syllables in Table 1, an appropriate cutoff method or a dynamic planning method of matching should preferably be utilized to speed up the process. Furthermore, only such candidate syllables with appropriate temporal relationships may be included. According to a test example, C=25 for "shi/N/ji/ku" and C=36 for "shi/N/ju/ku" while C=29 for "shi/N/ji/ko" ("Shinjiko" being the name of a lake in western Japan). These values are received by the judging unit 9 which selects candidate syllable arrays according to the calculated values of C. If the results cited above are sorted, the first candidate is "shinjuku" as pronounced "shinjiku", the second candidate is "shinjiko" (the name of a lake) and the third candidate is "shinjuku", the second candidate is "shinjiko" (the name of a lake) and the third candidate is "shinjuku" as pronounced "shinjuku". This means that the input voice signal intended to be interpreted as "Shinjuku" (the district) would be erroneously recognized as "Shinjiko" (the lake) if the commonly occurring phonological change from "ju" to "ji" according to the rule table for rewriting were not taken into consideration. According to the method of evaluation described above, the aforementioned phonological change is taken into account and, as a result, "Shinjuku" as pronounced "shinjiko" becomes the first candidate.

As another example, the score C may be calculated by the formula $$C = \sum_{i=1}^{N} X_i + W \sum_{i=1}^{M} Y_i + V \sum_{i=1}^{N} Z_i$$

where $Z_i$ is the $i^{th}$ penalty value of the second kind defined in connection with Table 2, V is another rate factor and the other symbols are as defined above. Let us consider a situation where the syllable lattice corresponding to an input syllable array "Shinjuku" has no data on the syllable "ku" such that the portion of Table 1 below the 21st line looks as shown in Table 4. In such a case, neither "shinjiku" nor "shinjuku" can be considered as a candidate syllable array, but one obtains by the formula given above C=34 for "shi/N/ji/pu" (mispronounced district name) and C=36 for "shi/N/ji/ko" (the lake) with V=2 and W=3, and this causes the judging unit 9 to correctly interpret the input voice signal as that of "Shinjuku".

TABLE 4

| Candidate Syllable | Score | Start | End |
| --- | --- | --- | --- |
| pu (22) | 8 | 80 | 92 |
| ko (23) | 17 | 80 | 94 |
| po (24) | 19 | 80 | 94 |

As a further example, if C is calculated with W=0 and V=2 for a situation with a part of Table 1 changed as shown by Table 4 and by using Tables 2 and 3, one obtains C=31 for "shi/N/ju/ku" and C=36 for "shi/N/ji/ko". In this case, too, the judging unit 9 thereupon chooses "Shinjuku" as the first candidate and "Shinjiko" as the second candidate although an erroneous recognition would result if phonological variations were not taken into consideration.

In summary, the present invention is characterized in that phonological variations, which are generated when words and sentences are spoken, are taken into consideration such that the speaker need not make any conscious effort to speak each syllable clearly but can speak in the most natural way in which he is accustomed.

The foregoing description of the present invention has been presented for purposes of illustration and description. It is not intended to be exhaustive or to limit the invention to the precise form disclosed, and many modifications and variations are possible in light of the above teaching. For example, the present invention is not limited in application to the Japanese language. Recognition may be made not only in units of syllable arrays but also of words, phrases or sentences. Any modifications or variations which may be apparent to a person skilled in the art are intended to be included within the scope of this invention.

What is claimed is:

1. A voice recognition method by analyzing syllables, said method comprising the steps of comparing an input voice signal with standard syllable patterns to thereby extract candidate syllables sequentially from said input voice signal, each of said candidate syllables having a reliability score associated therewith, generating hypothetical syllable arrays according to a predefined conversion rule from standard syllable arrays output from memory, each of said hypothetical syllable arrays being generated by modifying one of said standard syllable arrays and assigning a penalty value indicative of allowability of modification in said hypothetical syllable array, and comparing said candidate syllables with said hypothetical syllable arrays and thereby selecting one of said hypothetical syllable arrays by computing evaluation scores based on some of said penalty values, wherein said hypothetical syllable arrays are generated from corresponding one of said standard syllable arrays by incorporating examples of commonly committed variations of pronunciation of said standard syllable arrays and said penalty values are determined according to allowability of each of said commonly committed variations of pronunciation.

2. The method of claim 1 wherein said hypothetical syllable arrays are generated from corresponding ones of said standard syllable arrays by incorporating both examples of common syllables which sound like and are therefore often confused and examples of commonly committed variations of pronunciation of said standard syllable arrays and said penalty values are determined according to severity of confusion and allowability of variation of pronunciation.

3. A voice recognition method by analyzing syllables, said method comprising the steps of comparing an input voice signal with standard syllable patterns to thereby extract candidate syllables sequentially from said input voice signal, each of said candidate syllables having a reliability score associated therewith, generating hypothetical syllable arrays according to a predefined conversion rule from standard syllable arrays output from memory, each of said hypothetical syllable arrays being generated by modifying one of said standard syllable arrays and assigned a penalty value indicative of allowability of modification in said hypothetical syllable array, and comparing said candidate syllables with said hypothetical syllable arrays and thereby selecting one of said hypothetical syllable arrays by computing evaluation scores based on some of said penalty values, wherein said hypothetical syllable arrays are generated from corresponding ones of said standard syllable arrays by incorporating examples of common syllables which sound alike and are therefore often confused and said penalty values are determined according to severity of confusion.

4. The method of claim 3 wherein said hypothetical syllable arrays are generated from corresponding ones of said standard syllable arrays by incorporating both examples of common syllables which sound alike and are therefore often confused and examples of commonly committed variations of pronunciation of said standard syllable arrays and said penalty values are determined according to severity of confusion and allowability of variation of pronunciation.

* * * * *

UNITED STATES PATENT AND TRADEMARK OFFICE
CERTIFICATE OF CORRECTION

PATENT NO. : 5,129,000

DATED : July 7, 1992

INVENTOR(S) : Atsuo Tanaka

It is certified that error appears in the above-identified patent and that said Letters Patent is hereby corrected as shown below:

Title page, item
[63] entitled "Related U.S. Application Data" on the first line, please change "Ser. No. 568,547" to read --Ser. No. 568,548--.

Signed and Sealed this

Fourteenth Day of September, 1993

*Attest:*

BRUCE LEHMAN

*Attesting Officer*  *Commissioner of Patents and Trademarks*